United States Patent
Sugahara

(10) Patent No.: US 10,152,437 B2
(45) Date of Patent: Dec. 11, 2018

(54) MEMORY SYSTEM

(71) Applicant: MegaChips Corporation, Osaka-shi (JP)

(72) Inventor: Takahiko Sugahara, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 199 days.

(21) Appl. No.: 15/205,682

(22) Filed: Jul. 8, 2016

(65) Prior Publication Data

US 2017/0010989 A1    Jan. 12, 2017

(30) Foreign Application Priority Data

Jul. 10, 2015 (JP) ................................ 2015-139254
Jul. 10, 2015 (JP) ................................ 2015-139255

(51) Int. Cl.
| | | |
|---|---|---|
| *G06F 13/36* | (2006.01) | |
| *G06F 13/362* | (2006.01) | |
| *G06F 13/16* | (2006.01) | |
| *G06F 13/40* | (2006.01) | |

(52) U.S. Cl.
CPC ...... *G06F 13/1689* (2013.01); *G06F 13/4068* (2013.01)

(58) Field of Classification Search
CPC .......................... G06F 13/1689; G06F 13/4068
USPC ........................................................... 710/113
See application file for complete search history.

(56) References Cited

U.S. PATENT DOCUMENTS 9,263,103 B2    2/2016    Giovannini et al.

FOREIGN PATENT DOCUMENTS

| | | |
|---|---|---|
| JP | 2001-110183 A | 4/2001 |
| JP | 2004-145999 | 5/2004 |
| JP | 2011-508311 | 3/2011 |
| JP | 2011-216079 | 10/2011 |

OTHER PUBLICATIONS

Japanese Office Action dated Jul. 3, 2017 in Patent Application No. 2015-139254 (with English translation).

*Primary Examiner* — Chun Kuan Lee
(74) *Attorney, Agent, or Firm* — Xsensus, LLP

(57) ABSTRACT

A control circuit of a memory device feeds a first clock received from a transmission control circuit of a host device back to a reception control circuit of the host device as a second clock. The reception control circuit controls data reception from the memory device in synchronization with the fed-back second clock.

6 Claims, 9 Drawing Sheets

MEMORY SYSTEM

CROSS REFERENCE TO RELATED APPLICATIONS

The present application is based on, and claims priority from Japanese Patent Application Serial Numbers 2015-139254 and 2015-139255, the disclosure of which is hereby incorporated by reference herein in its entirety.

BACKGROUND

Technical Field

The present disclosure relates to a memory system including a host device and a memory device.

Related Art

In memory systems including a host device and a memory device connected thereto, data transfer within one clock cycle in a memory system configured to operate in synchronization with a clock is generally becoming increasingly difficult with a higher operation speed of the system which increases propagation delays of clocks and data to be transmitted and received between the host and the memory devices.

In general memory systems, transmission and reception of data between the devices is performed in synchronization with data strobe signals generated within the system in order to prevent data loss caused by an increase in a data delay amount (see for example, JP2004-145999A, JP2011-216079A, and JP2011-508311A).

For encrypted communication between a host and a memory devices, both encryption and decryption are performed in synchronization with a single common clock in general memory sy stems.

SUMMARY

A memory system includes a host device and a memory device configured to be connected to the host device. The host device includes a transmission control circuit configured to control command transmission to the memory device in synchronization with a first clock, and a reception control circuit configured to control data reception from the memory device in synchronization with a second clock. The memory device includes a memory array configured to store data, and a control circuit configured to control an access to the memory array. The transmission control circuit is configured to transmit the first clock to the control circuit. The control circuit is configured to transmit the first clock received from the transmission control circuit to the reception control circuit as the second clock.

DETAILED DESCRIPTION

Figure 1:
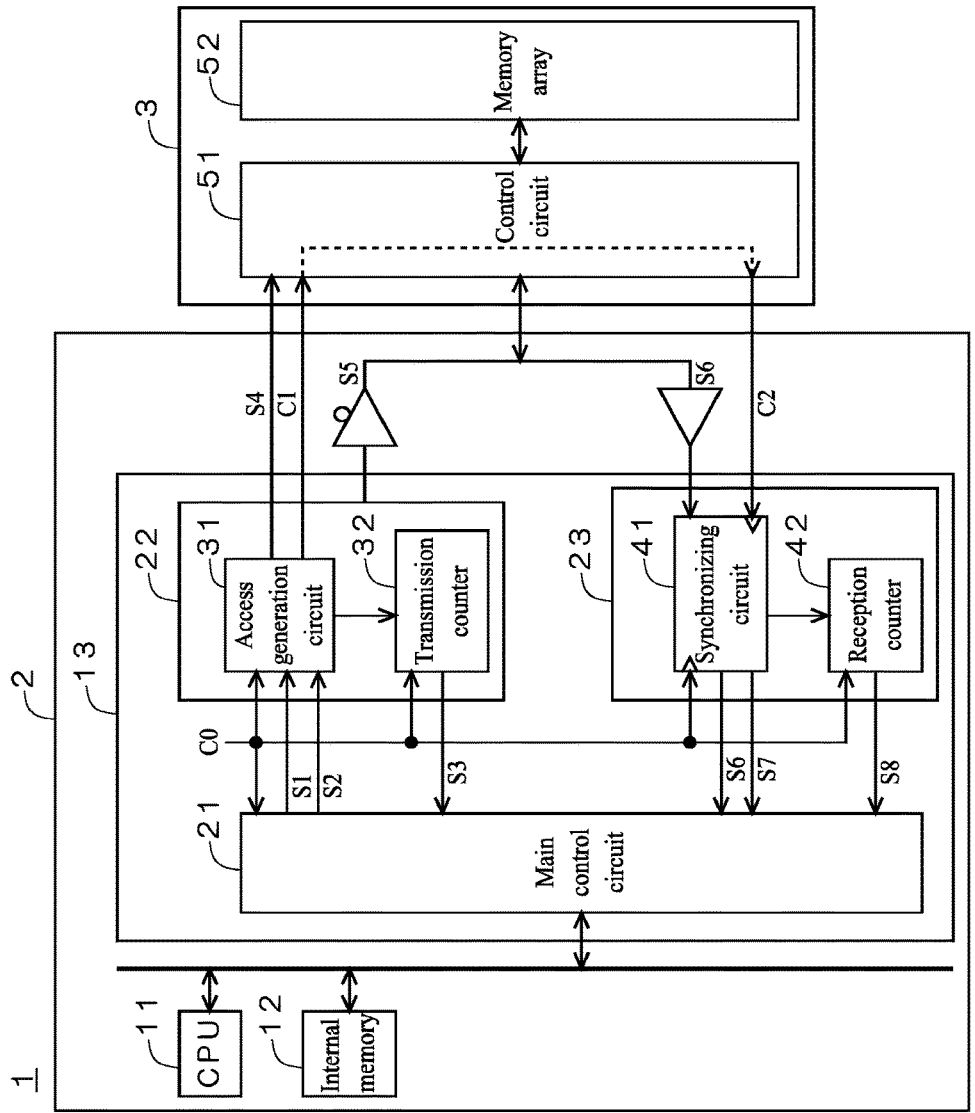
FIG. 1 is a diagram illustrating a configuration of a memory system according to Embodiment 1 of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

Transmission and reception of data with data strobe signals requires a circuit for generating data strobe signals and a timing-adjustment circuit for adjusting phases between clocks and data strobe signals, resulting in complicated circuit design and increased manufacturing costs and circuit size. In actual use of memory systems, these circuits may require calibration, which results in inefficient manufacturing.

The present disclosure is directed to obtaining a memory system including a host device and a memory device connected thereto that achieves enhanced-speed communication between these devices at low cost and in a simple manner.

A memory system according to an aspect of the present disclosure includes a host device and a memory device configured to be connected to the host device, the host device including a transmission control circuit configured to control command transmission to the memory device in synchronization with a first clock, and a reception control circuit configured to control data reception from the memory device in synchronization with a second clock, the memory device including a memory array configured to store data, and a control circuit configured to control an access to the memory array, the transmission control circuit being configured to transmit the first clock to the control circuit, and the control circuit being configured to transmit the first clock received from the transmission control circuit to the reception control circuit as the second clock.

In the memory system according to this aspect, the control circuit of the memory device feeds the first clock received from the transmission control circuit of the host device back to the reception control circuit of the host device as the second clock. The reception control circuit controls data reception from the memory device in synchronization with the fed-back second clock. No need for newly generating a data strobe signal separate from the first and the second clocks allows omission of a data strobe signal generation circuit and a timing-adjustment circuit, and in consequence, enhanced-speed communication between the host device and the memory device is realized at low cost and in a simple manner. Since the first clock is fed back as the second clock, in transmitting the data readout from the memory array from the memory device to the host device in synchronization with the second clock, a propagation delay amount due to wiring and buffer delays is substantially canceled with the second clock and the data, which in consequence prevents data loss.

In some embodiments, the host device further includes a main control circuit configured to control the transmission control circuit and the reception control circuit, the main control circuit is configured to determine a predetermined correction value based on a propagation delay amount between the host device and the memory device, and the transmission control circuit is configured to correct a cycle number of the first clock between start of data reception from the memory device and completion of the data reception based on the correction value received from the main control circuit.

According to such embodiments, the main control circuit of the host device determines a predetermined correction value on the basis of a propagation delay amount between the host device and the memory device, and on the basis of this correction value, the transmission control circuit corrects the cycle number of the first clock between start of data reception from the memory device and completion of data reception. As described above, correcting a fixed number of cycles defined by a communication protocol on the basis of a correction value determined from an undefined amount of propagation delay ensures a fixed number of cycles without excess and deficiency, which realizes a normal operation of the system.

In some embodiments, the transmission control circuit includes a first counter configured to count a cycle number of the first clock, the reception control circuit includes a second counter configured to count a cycle number of the second clock, and the main control circuit is configured to determine the correction value based on a count value of the first counter between completion of command transmission to the memory device and reception of a ready signal from the memory device and a count value of the second counter between reception of an initial busy signal from the memory device and reception of the ready signal from the memory device.

According to such embodiments, the main control circuit determines a correction value on the basis of a count value of the first counter between completion of command transmission to the memory device and reception of a ready signal from the memory device, and a count value of the second counter between reception of an initial busy signal from the memory device and reception of the ready signal from the memory device. Thus a correction value is accurately determined on the basis of an undefined amount of propagation delay due to wiring and buffer delays and an undefined number of busy cycles in readouts of data from the memory array, which realizes highly accurate correction of the fixed number of cycles.

In some embodiments, the transmission control circuit includes a first counter configured to count a cycle number of the first clock, and the main control circuit is configured to determine the correction value based on a count value of the first counter between completion of command transmission to the memory device and reception of an initial busy signal from the memory device.

According to such embodiments, the main control circuit determines a correction value based on a count value of the first counter between completion of command transmission to the memory device and reception of an initial busy signal from the memory device. Thus the correction value is determined in a simple manner on the basis of an undefined amount of propagation delay due to wiring and buffer delays. Since the correction value is determined at an early stage without waiting for a busy cycle to terminate, in case of an abnormal correction value, error handling can be started at an early stage. Furthermore, with no need for the second counter and with reduced count values of the first counter, the circuit size of the host device is reduced as whole.

According to some embodiments of the present disclosure, a memory system achieves enhanced-speed communication between the host device and the memory device at low cost and in a simple manner.

In encrypted communication in which both encryption and decryption are performed in synchronization with a single clock, appropriately synchronizing encryption and decryption is becoming increasingly difficult with a higher communication speed.

The present disclosure is also directed to obtaining a memory system including a host device and a memory device connected thereto that achieves enhanced-speed encrypted communication between these devices at low cost and in a simple manner.

A memory system according to an aspect of the present disclosure includes a host device and a memory device configured to be connected to the host device, the host device including a transmission control circuit configured to control command transmission to the memory device in synchronization with a first clock, an encryption circuit configured to encrypt a command to be transmitted to the memory device in synchronization with a first clock to generate an encrypted command, a reception control circuit configured to control data reception from the memory device in synchronization with a second clock, and a decryption circuit configured to decrypt encrypted data received from the memory device in synchronization with a second clock.

In the memory system according to this aspect, the transmission control circuit and the encryption circuit operates in synchronization with the first clock, and the reception control circuit and the decryption circuit operates in synchronization with the second clock. Thus even when a communication is enhanced, encryption and decryption are appropriately synchronized and in consequence, enhanced-speed encrypted communication between the host device and the memory device is realized at low cost and in a simple manner.

In some embodiments, the memory device includes a memory array configured to store data and a control circuit configured to control an access to the memory array, the transmission control circuit is configured to transmit the first clock to the control circuit, and the control circuit is configured to transmit the first clock received from the transmission control circuit to the reception control circuit as the second clock.

According to such embodiments, the control circuit of the memory device feeds the first clock received from the transmission control circuit of the host device back to the reception control circuit of the host device as the second clock. The reception control circuit controls data reception from the memory device in synchronization with the fed-back second clock. No need for newly generating a data strobe signal separate from the first and the second clocks allows omission of a data strobe signal generation circuit and a timing-adjustment circuit, and in consequence, enhanced-speed encrypted communication between the host device and the memory device is realized at low cost and in a simple manner. Since the first clock is fed back as the second clock, in transmitting the data readout from the memory array from the memory device to the host device in synchronization with the second clock, a propagation delay amount due to wiring and buffer delays is substantially canceled with the second clock and the data, which in consequence prevents data loss.

In some embodiments, the host device further includes a main control circuit configured to control the transmission control circuit and the reception control circuit, the main control circuit is configured to determine a predetermined correction value based on a propagation delay amount between the host device and the memory device, and the transmission control circuit is configured to correct a cycle number of the first clock between start of data reception from the memory device and completion of the data reception based on the correction value received from the main control circuit.

According to such embodiments, the main control circuit of the host device determines a predetermined correction value on the basis of a propagation delay amount between the host device and the memory device, and on the basis of this correction value, the transmission control circuit corrects the cycle number of the first clock between start of data reception from the memory device and completion of data reception. As described above, correcting a fixed number of cycles defined by a communication protocol on the basis of a correction value determined from an undefined amount of propagation delay ensures a fixed number of cycles without excess and deficiency, and in consequence, internal conditions of the encryption circuits and the decryption circuit of the host device and the encryption circuit and the decryption circuit of the memory device agree, which realizes a normal operation of the system.

In some embodiments, the transmission control circuit includes a first counter configured to count a cycle number of the first clock, the reception control circuit includes a second counter configured to count a cycle number of the second clock, and the main control circuit is configured to determine the correction value based on a count value of the first counter between completion of command transmission to the memory device and reception of a ready signal from the memory device and a count value of the second counter between reception of an initial busy signal from the memory device and reception of the ready signal from the memory device.

According to such embodiments, the main control circuit determines a correction value on the basis of a count value of the first counter between completion of command transmission to the memory device and reception of a ready signal from the memory device, and a count value of the second counter between reception of an initial busy signal from the memory device and reception of the ready signal from the memory device. Thus a correction value is accurately determined on the basis of an undefined amount of propagation delay due to wiring and buffer delays and an undefined number of busy cycles in readouts of data from the memory array, which realizes highly accurate correction of the fixed number of cycles.

In some embodiments, the transmission control circuit includes a first counter configured to count a cycle number of the first clock, the main control circuit is configured to calculate the correction value based on a count value of the first counter between completion of command transmission to the memory device and reception of an initial busy signal from the memory device.

According to such embodiments, the main control circuit the main control circuit determines a correction value based on a count value of the first counter between completion of command transmission to the memory device and reception of an initial busy signal from the memory device. Thus the correction value is determined in a simple manner on the basis of an undefined amount of propagation delay due to wiring and buffer delays. Since the correction value is determined at an early stage without waiting for a busy cycle to terminate, in case of an abnormal correction value, error handling can be started at an early stage. Furthermore, with no need for the second counter and with reduced count values of the first counter, the circuit size of the host device is reduced as whole.

In some embodiments, the encryption circuit and the decryption circuit are provided as a common encryption/decryption circuit.

According to such embodiments, the encryption/decryption circuit commonly acting as an encryption circuit and a decryption circuit reduces a circuit size of the host device, in comparison with a separately provided encryption circuit and decryption circuit.

In some embodiments, the encryption circuit and the decryption circuit are separately provided.

According to such embodiments, separately provided encryption circuit and decryption circuit facilitate optimal circuit designs independently for the encryption circuit and the decryption circuit.

In some embodiments, the transmission control circuit is configured to input a first synchronization signal to the encryption circuit and the decryption circuit to operate the decryption circuit in a period in which the encryption circuit encrypts a command, and the reception control circuit is configured to input a second synchronization signal to the encryption circuit and the decryption circuit to operate the encryption circuit in a period in which the decryption circuit decrypts encrypted data.

According to such embodiments, the transmission control circuit inputs the first synchronization signal to the encryption circuit and the decryption circuit, so as to operate the decryption circuit in a period in which the encryption circuit encrypts a command. The reception control circuit inputs the second synchronization signal to the encryption circuit and the decryption circuit, so as to operate the encryption circuit in a period in which the decryption circuit decrypts encrypted data. As described above, one of the encryption circuit and the decryption circuit is operated in vain in a period in which the other performs processes so that internal conditions such as key streams of the encryption circuit and the decryption circuit agree, which in consequence realizes an appropriate encrypted communication.

According to some embodiments of the present disclosure, a memory system achieves enhanced-speed encrypted communication between the host device and the memory device at low cost and in a simple manner.

These and other objects, features, aspects and advantages of the present disclosure will become more apparent from the following detailed description when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

Embodiment 1

FIG. 1 is a diagram illustrating a configuration of a memory system 1 according to Embodiment 1 of the present disclosure. As illustrated in FIG. 1, the memory system 1 includes a host device 2 and a memory device 3 such as a semiconductor memory detachably connected to the host device 2.

The host device 2 includes a CPU 11, an internal memory 12, and a memory controller 13. The memory controller 13 includes a main control circuit 21, a transmission control circuit 22, and a reception control circuit 23. The transmission control circuit 22 controls transmission of a command S5 to the memory device 3 in synchronization with a clock C1. The reception control circuit 23 controls reception of data S6 from the memory device 3 in synchronization with a clock C2. The main control circuit 21 controls the transmission control circuit 22 and the reception control circuit 23. As illustrated in FIG. 1, the transmission control circuit 22 includes an access generation circuit 31 and a transmission counter 32. The reception control circuit 23 includes a synchronizing circuit 41 and a reception counter 42.

The main control circuit 21, the access generation circuit 31, the transmission counter 32, the synchronizing circuit 41, and the reception counter 42 receive a common reference clock C0. The access generation circuit 31 generates the clock C1 on the basis of the reference clock C0. For example, the reference clock C0 is divided to generate the clock C1 having a cycle equivalent to four cycles of the reference clock C0.

The memory device 3 includes a memory array 52 for storing arbitrary data S6 such as content data and a control circuit 51 that controls an access to the memory array 52.

Description is given below of an operation of the memory system 1 with an example of reading the data S6 stored in the memory array 52 from the memory device 3 to the host device 2. In the following example, it is assumed that in the memory system, a command length is fixed at eight bytes and a readout data length is fixed at 512 bytes by a communication protocol, and ready/busy mode is adopted for latency.

Figure 2:
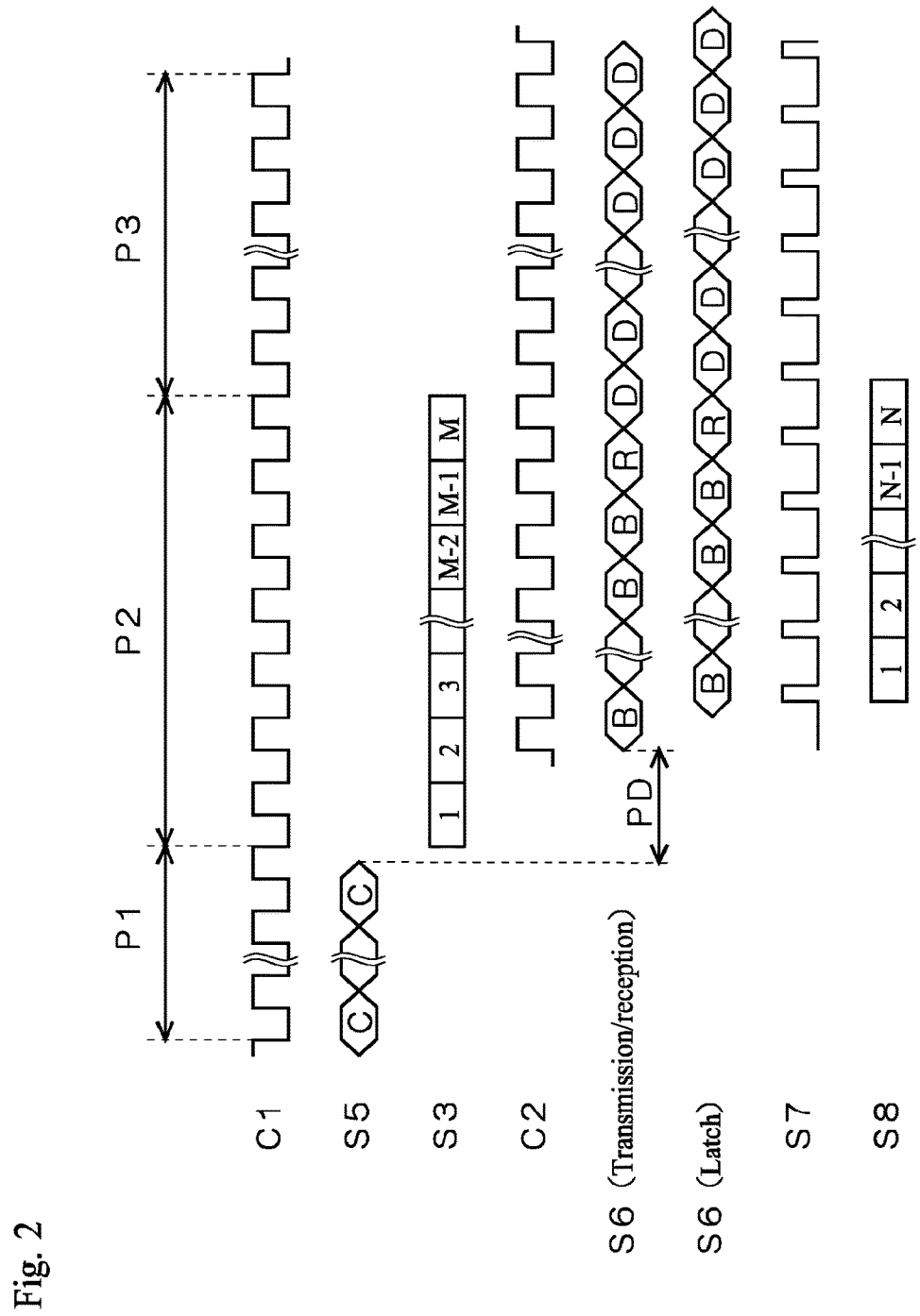
FIG. 2 is a timing diagram illustrating a readout operation by the memory system.

FIG. 2 is a timing diagram illustrating a readout operation by the memory system 1. The CPU 11 inputs a readout command containing address information, a readout size, and the like, to the main control circuit 21. The main control circuit 21 decodes the inputted readout command, so as to input command data S1 and a control signal S2 containing access information and an access start flag to the access generation circuit 31.

The access generation circuit 31 generates an access control signal S4 for accessing the memory device 3 on the basis of the inputted access information, and transmits this access control signal S4 to the memory device 3. The access generation circuit 31 also generates the clock C1 on the basis of the reference clock C0 as described above, and transmits this clock C1 to the memory device 3. The access generation circuit 31 further generates the command S5 on the basis of the inputted command data S1, and transmits this command S5 to the memory device 3 in synchronization with the clock C1. Since the command length is eight bytes and one byte of data is transferred within one cycle of the clock C1 in the example of the present embodiment, a command transmission period is a period P1 (FIG. 2) of a fixed length equivalent to eight cycles of the clock C1. Upon transmission of the last byte (eighth byte) of the command S5, the access generation circuit 31 causes the transmission counter 32 to start a count operation, and the transmission counter 32 counts the number of cycles onward of the clock C1.

The control circuit 51 of the memory device 3 feeds the clock C1 received from the host device 2 back to the host device 2, by transmitting the clock C2 having the same frequency as the clock C1 to the host device 2. The control circuit 51 also decodes the received command S5, so as to read desired data S6 from the memory array 52. Until readout of the data S6 from the memory array 52 is completed, the control circuit 51 transmits a busy signal to the host device 2. When readout is completed, a ready signal is transmitted, followed by the data S6. The busy signal, the ready signal, and the data S6 are transmitted in synchronization with the clock C2.

Referring to FIG. 2, a period P2 from when the host device 2 completes transmission of the last byte of the command S5 until when reception of the ready signal is completed is a ready/busy period. A period P3 following the ready/busy period P2 is a data reception period during which the host device 2 receives the data S6 from the memory device 3. In the example of the present embodiment, the period P3 having a fixed length equivalent to 512 cycles of the clock C2 is the data reception period, since a readout data length is 512 bytes and one-byte data is transferred within one cycle of the clock C2. The number of cycles in the data reception period P3 of the clock C1 is corrected as described below.

In transmission/reception of commands and data between the host device 2 and the memory device 3, propagation delays of undefined length occur due to wiring delays between the two devices and buffer delays in an input/output buffer of the memory device 3. In enhancing communication speed with the high-frequency clocks C1 and C2, the propagation delay amount becomes larger than one cycle of the clocks C1 and C2. As illustrated in FIG. 2, a propagation delay PD exceeding one cycle of the clocks C1 and C2 occurs between completion of transmission of the last byte of the command S5 and start of reception of the leading busy signal. Since the delay amount of the propagation delay PD is undefined and the number of cycles in which busy signals continue is also undefined, the ready/busy period P2 has an undefined length.

Referring to FIG. 1, the reception control circuit 23 of the host device 2 receives the busy signal, the ready signal, and the data S6 sequentially transmitted from the memory device 3 in synchronization with the clock C2, and inputs these signals and data to the main control circuit 21. The synchronizing circuit 41 generates a synchronization signal S7 by synchronizing the busy signal with the reference clock C0 every time the busy signal is received, and inputs this synchronization signal S7 to the main control circuit 21. Upon reception of the leading busy signal, the synchronizing circuit 41 causes the reception counter 42 to start a count operation, and the reception counter 42 counts the number of cycles onward of the synchronization signal S7.

Upon reception of the ready signal from the reception control circuit 23, the main control circuit 21 obtains count values S3 and S8 at the time respectively from the transmission counter 32 and the reception counter 42. Then a delay cycle correction value is calculated by subtracting the count value S8 from the count value S3. This delay cycle correction value is input to the access generation circuit 31 as access information. Upon reception of the ready signal from the reception control circuit 23, the main control circuit 21 terminates the ready/busy period P2 and subsequently moves to the data reception period P3.

The access generation circuit 31 corrects the number of cycles in the data reception period, on the basis of the inputted delay cycle correction value. In the example of the present embodiment, since a readout data length is 512 bytes and one-byte data is transferred within one cycle of the clock C1, the terminal point of the data reception period P3 is primarily when the clock C1 proceeds by 512 cycles after the ready/busy period P2 terminates. The access generation circuit 31 subtracts the number of cycles equivalent to the inputted delay cycle correction value from the number of cycles in the data reception period defined by a communication protocol (in this example, 512 cycles), so as to correct the number of cycles in the data reception period P3. For example, with the delay cycle correction value being "two cycles," the terminal point of the data reception period P3 is when the clock C1 proceeds by 510 (=512−2) cycles after the ready/busy period P2 terminates.

In the corrected data reception period P3, the main control circuit 21 transfers the data S6 sequentially inputted from the reception control circuit 23 to the CPU 11.

As described above, in the memory system 1 according to the present embodiment, the control circuit 51 of the memory device 3 feeds the clock C1 (first clock) received from the transmission control circuit 22 of the host device 2 back to the reception control circuit 23 of the host device 2 as the clock C2 (second clock). The reception control circuit 23 controls data reception from the memory device 3 in synchronization with the fed-back clock C2. No need for newly generating a strobe signal separate from the clocks C1 and C2 allows omission of a data strobe signal generation circuit and a timing-adjustment circuit, and in consequence, enhanced-speed communication between the host device 2 and the memory device 3 is realized at low cost and in a simple manner. Since the clock C1 is fed back as the clock C2, in transmitting the data S6 readout from the memory array 52 from the memory device 3 to the host device 2 in synchronization with the clock C2, a propagation delay amount due to wiring and buffer delays is substantially canceled with the clock C2 and the data S6, which in consequence prevents data loss.

The main control circuit 21 of the host device 2 calculates a delay cycle correction value on the basis of a propagation delay amount between the host device 2 and the memory device 3, and on the basis of this delay cycle correction value, the transmission control circuit 22 corrects the number of cycles of the clock C1 between start of data reception from the memory device 3 and completion of data reception (that is, a terminal point of the data reception period P3). As described above, correcting a fixed number of cycles defined by a communication protocol on the basis of a delay cycle correction value calculated from an undefined amount of propagation delay ensures a fixed number of cycles without excess and deficiency, which realizes a normal operation of the system.

The main control circuit 21 calculates a delay cycle correction value on the basis of the count value S3 of the transmission counter 32 (first counter) between completion of transmission of the command S5 to the memory device 3 and reception of a ready signal from the memory device 3, and the count value S8 of the reception counter 42 (second counter) between reception of the initial busy signal from the memory device 3 and reception of the ready signal from the memory device 3. Thus a delay cycle correction value is accurately calculated on the basis of an undefined amount of propagation delay due to wiring and buffer delays and an undefined number of busy cycles in readouts of the data S6 from the memory array 52, which realizes highly accurate correction of the fixed number of cycles in the data reception period P3.

Modification 1

Figure 3:
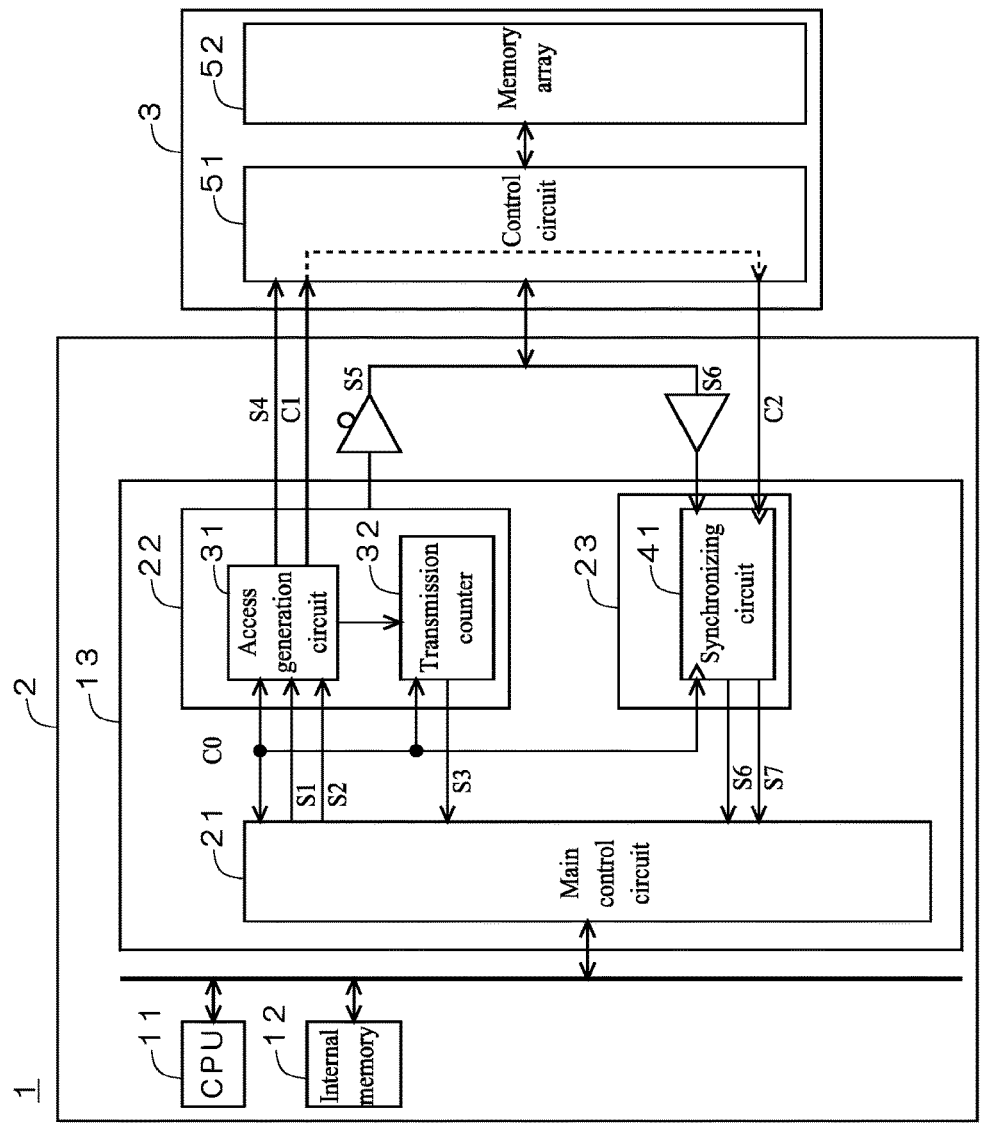
FIG. 3 is a diagram illustrating a configuration of the memory system according to Modification 1.
Figure 4:
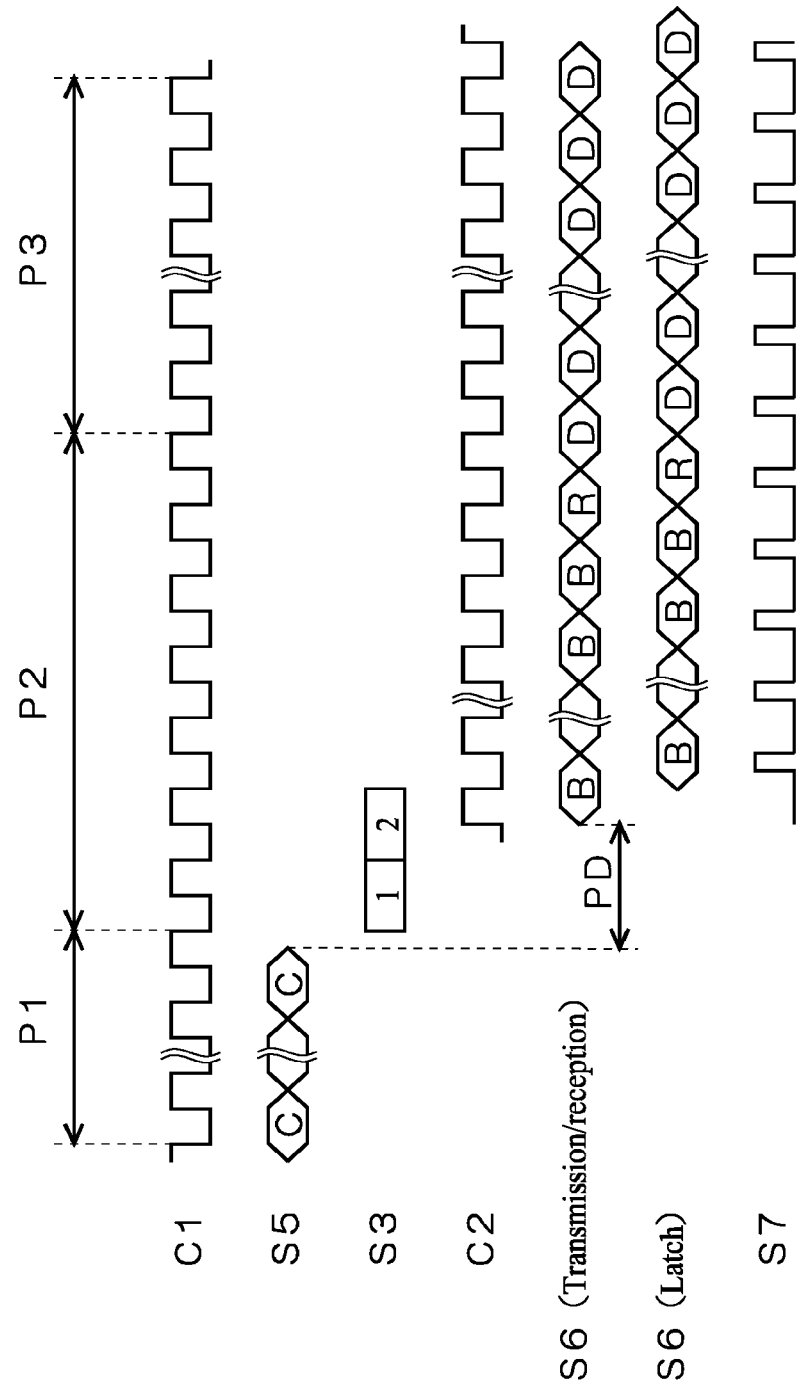
FIG. 4 is a timing diagram illustrating a readout operation by the memory system.

FIG. 3 is a diagram illustrating a configuration of the memory system 1 according to a modification of Embodiment 1. The reception counter 42 is omitted from the configuration illustrated in FIG. 1. FIG. 4 is a timing diagram illustrating a readout operation by the memory system 1.

Upon transmission of the last byte (eighth byte) of the command S5, the access generation circuit 31 causes the transmission counter 32 to start a count operation, and the transmission counter 32 counts the number of cycles onward of the clock C1.

Upon reception of the leading busy signal from the reception control circuit 23, the main control circuit 21 obtains the count value S3 at the time from the transmission counter 32. Then the number of cycles indicated by the count value S3 is determined as a delay cycle correction value. This delay cycle correction value is input to the access generation circuit 31 as access information.

The access generation circuit 31 subtracts the number of cycles equivalent to the inputted delay cycle correction value from the number of cycles in a data reception period defined by a communication protocol (in this example, 512 cycles), so as to correct the number of cycles in the data reception period P3. For example, with the delay cycle correction value being "two cycles," the terminal point of the data reception period P3 is when the clock C1 proceeds by 510 (=512−2) cycles after the ready/busy period P2 terminates.

As described above, in the memory system 1 according to the present modification, the main control circuit 21 determines a delay cycle correction value on the basis of the count value S3 of the transmission counter 32 between completion of transmission of the command S5 to the memory device 3 and reception of the initial busy signal from the memory device 3. Thus the delay cycle correction value is determined in a simple manner on the basis of an undefined amount of propagation delay due to wiring and buffer delays. Since the delay cycle correction value is determined at an early stage without waiting for the ready/busy period P2 to terminate, in case of an abnormal delay cycle correction value, error handling can be started at an early stage. Furthermore, with no need for the reception counter 42 and with reduced count values of the transmission counter 32, the circuit size of the host device 2 is reduced as a whole.

Embodiment 2

Figure 5:
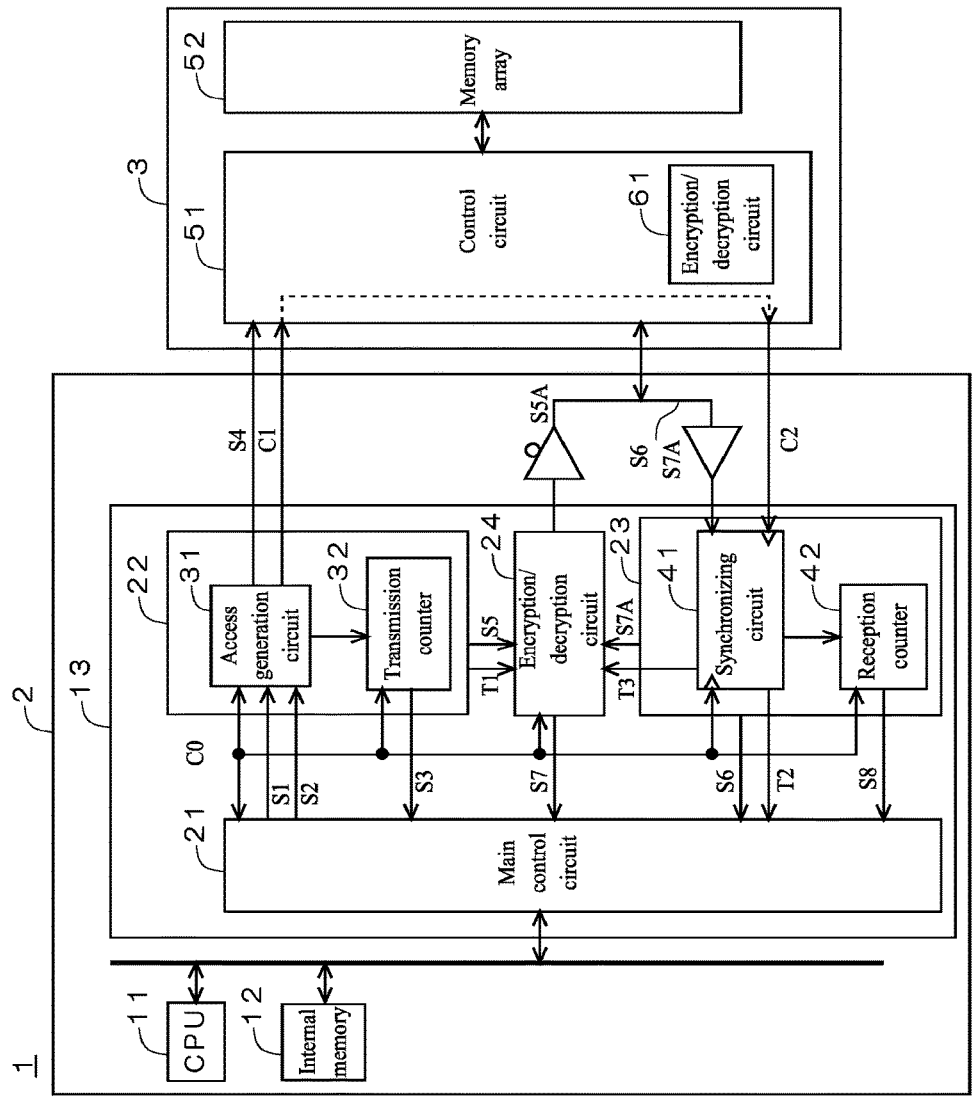
FIG. 5 is a diagram illustrating a configuration of a memory system according to Embodiment 2 of the present disclosure.

FIG. 5 is a diagram illustrating a configuration of a memory system 1 according to Embodiment 2 of the present disclosure. As illustrated in FIG. 5, the memory system 1 includes a host device 2 and a memory device 3 such as a semiconductor memory detachably connected to the host device 2.

The host device 2 includes a CPU 11, an internal memory 12, and a memory controller 13. The memory controller 13 includes a main control circuit 21, a transmission control circuit 22, a reception control circuit 23, and an encryption/decryption circuit 24. The transmission control circuit 22 controls encryption of a command S5 by the encryption/decryption circuit 24 and transmission of the encrypted command S5 to the memory device 3 in synchronization with the clock C1. The reception control circuit 23 controls reception of encrypted data S7A from the memory device 3 and decryption of the encrypted data S7A by the encryption/decryption circuit 24 in synchronization with the clock C2. The main control circuit 21 controls the transmission control circuit 22 and the reception control circuit 23. As illustrated in FIG. 5, the transmission control circuit 22 includes an access generation circuit 31 and a transmission counter 32. The reception control circuit 23 includes a synchronizing circuit 41 and a reception counter 42.

The main control circuit 21, the access generation circuit 31, the transmission counter 32, the encryption/decryption circuit 24, the synchronizing circuit 41 and the reception counter 42 receive a common reference clock C0. The access generation circuit 31 generates the clock C1 on the basis of the reference clock C0. For example, the reference clock C0 is divided to generate the clock C1 having a cycle equivalent to four cycles of the reference clock C0.

The memory device 3 includes a memory array 52 for storing arbitrary data S7 such as content data and a control circuit 51 that controls an access to the memory array 52. The control circuit 51 includes an encryption/decryption circuit 61 similar to the encryption/decryption circuit 24.

Description is given below of an operation of the memory system 1 with an example of reading data S7 stored in the memory array 52 from the memory device 3 to the host device 2. In the following example, it is assumed that in the memory system, a command length is fixed at eight bytes and a readout data length is fixed at 512 bytes by a communication protocol, and ready/busy mode is adopted for latency. It is also assumed that commands and readout data are to be encrypted, while busy and ready signals are not to be encrypted.

Figure 6:
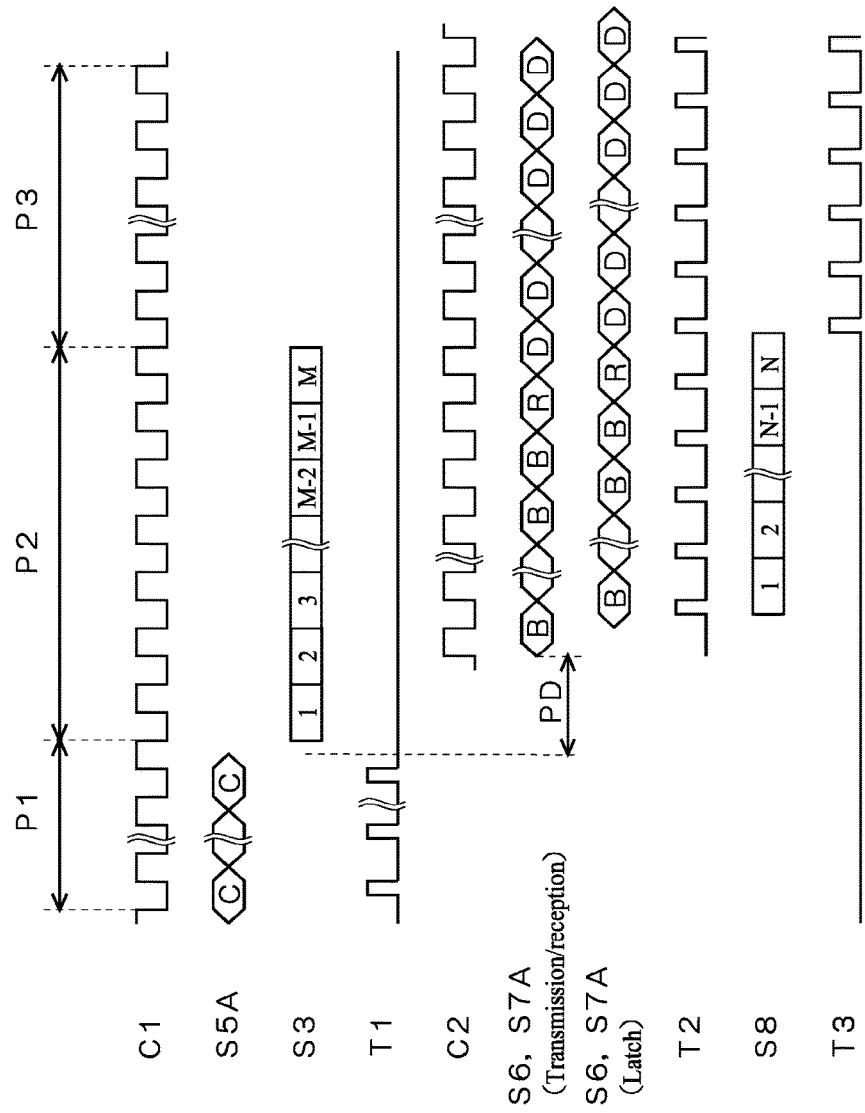
FIG. 6 is a timing diagram illustrating a readout operation by the memory system.

FIG. 6 is a timing diagram illustrating a readout operation by the memory system 1. The CPU 11 inputs a readout command containing address information, readout size, and the like, to the main control circuit 21. The main control circuit 21 decodes the inputted readout command, so as to input command data S1 and a control signal S2 containing access information and an access start flag to the transmission control circuit 22.

The access generation circuit 31 generates an access control signal S4 for accessing the memory device 3 on the basis of the inputted access information, and transmits the access control signal S4 to the memory device 3. The access generation circuit 31 also generates the clock C1 on the basis of the reference clock C0 as described above, and transmits the clock C1 to the memory device 3. The transmission control circuit 22 generates a synchronization signal T1 that synchronizes with the clock C1, and inputs this synchronization signal T1 to the encryption/decryption circuit 24. The transmission control circuit 22 also generates a non-encrypted command S5 on the basis of the inputted command data S1, and inputs this command S5 to the encryption/decryption circuit 24.

The encryption/decryption circuit 24 encrypts the command S5 in synchronization with the synchronization signal T1, so as to generate an encrypted command S5A. The encrypted command S5A is transmitted to the memory device 3 in synchronization with the clock C1. Since the command length is eight bytes and one-byte data is transferred within one cycle of the clock C1 in the example of the present embodiment, a command transmission period is a period P1 (FIG. 6) of a fixed length equivalent to eight cycles of the clock C1. Upon transmission of the last byte (eighth byte) of the encrypted command S5A, the transmission control circuit 22 causes the transmission counter 32 to start a count operation, and the transmission counter 32 counts the number of cycles onward of the clock C1. Upon transmission of the last byte (eighth byte) of the encrypted command S5A, the transmission control circuit 22 stops input of the synchronization signal T1 to the encryption/decryption circuit 24. The operation of the encryption/decryption circuit 24 stops along with termination of the command transmission period P1.

The control circuit 51 of the memory device 3 feeds the clock C1 received from the host device 2 back to the host device 2, by transmitting the clock C2 having the same frequency as the clock C1 to the host device 2. Alternatively, the clock C2 different from the clock C1 may be transmitted from the memory device 3 to the host device 2.

The encryption/decryption circuit 61 decrypts the received encrypted command S5A, so as to restore the non-encrypted command S5. The control circuit 51 decodes the command S5, so as to read desired data S7 from the memory array 52. Until readout of the data S7 from the memory array 52 and encryption of the data S7 by the encryption/decryption circuit 61 is completed, the control circuit 51 transmits a busy signal S6 to the host device 2. When readout and encryption are completed, a ready signal S6 is transmitted, followed by the encrypted data S7A. The busy signal S6, the ready signal S6, and the encrypted data S7A are transmitted in synchronization with the clock C2.

Referring to FIG. 6, a period P2 from when the host device 2 completes transmission of the last byte of the encrypted command S5A until when reception of the ready signal S6 is completed is a ready/busy period. A period P3 following the ready/busy period P2 is a data reception period during which the host device 2 receives the encrypted data S7A from the memory device 3. In the example of the present embodiment, the period P3 having a fixed length equivalent to 512 cycles of the clock C2 is the data reception period, since a readout data length is 512 bytes and one-byte data is transferred within one cycle of the clock C2. The number of cycles in the data reception period P3 of the clock C1 is corrected as described below.

In transmission/reception of encrypted commands and encrypted data between the host device 2 and the memory device 3, propagation delays of undefined length occur due to wiring delays between the two devices and buffer delays in an input/output buffer of the memory device 3. In enhancing communication speed with the high-frequency clocks C1 and C2, the propagation delay amount becomes larger than one cycle of the clocks C1 and C2. As illustrated in FIG. 6, a propagation delay PD exceeding one cycle of the clocks C1 and C2 occurs between completion of transmission of the last byte of the encrypted command S5A and start of reception of the leading busy signal S6. Since the delay amount of the propagation delay PD is undefined and the number of cycles in which busy signals continue is also undefined, the ready/busy period P2 has an undefined length.

Referring to FIG. 5, the reception control circuit 23 of the host device 2 receives the busy signal S6, the ready signal S6, and the encrypted data S7A sequentially transmitted from the memory device 3 in synchronization with the clock C2. The reception control circuit 23 inputs the busy signal S6 and the ready signal S6 to the main control circuit 21, and inputs the encrypted data S7A to the encryption/decryption circuit 24. The synchronizing circuit 41 generates a synchronization signal T2 by synchronizing the busy signal S6 with the reference clock C0 every time the busy signal S6 is received, and inputs this synchronization signal T2 to the main control circuit 21. Upon reception of the leading busy signal S6, the synchronizing circuit 41 causes the reception counter 42 to start a count operation, and the reception counter 42 counts the number of cycles onward of the synchronization signal T2. In a case where encryption is to be performed also in the ready/busy period P2, the synchronization signal T2 is input to the encryption/decryption circuit 24.

Upon reception of the ready signal S6 from the reception control circuit 23, the main control circuit 21 obtains count values S3 and S8 at the time respectively from the transmission counter 32 and the reception counter 42. Then a delay cycle correction value is calculated by subtracting the count value S8 from the count value S3. This delay cycle correction value is input to the access generation circuit 31 as access information. Upon reception of the ready signal S6 from the reception control circuit 23, the main control circuit 21 terminates the ready/busy period P2 and subsequently moves to the data reception period P3.

The access generation circuit 31 corrects the number of cycles in the data reception period, on the basis of the inputted delay cycle correction value. In the example of the present embodiment, since a readout data length is 512 bytes and one-byte data is transferred within one cycle of the clock C1, the terminal point of the data reception period P3 is primarily when the clock C1 proceeds by 512 cycles after the ready/busy period P2 terminates. The access generation circuit 31 subtracts the number of cycles equivalent to the inputted delay cycle correction value from the number of cycles in the data reception period defined by a communication protocol (in this example, 512 cycles), so as to correct the number of cycles in the data reception period P3. For example, with the delay cycle correction value being "two cycles," the terminal point of the data reception period P3 is when the clock C1 proceeds by 510 (=512−2) cycles after the ready/busy period P2 terminates.

In the corrected data reception period P3, the reception control circuit 23 inputs the encrypted data S7A received from the memory device 3 to the encryption/decryption circuit 24. The synchronizing circuit 41 generates a synchronization signal T3 by synchronizing the encrypted data S7A with the reference clock C0 every time the encrypted data S7A is received, and inputs this synchronization signal T3 to the encryption/decryption circuit 24.

The encryption/decryption circuit 24 decrypts the encrypted data S7A in synchronization with the synchronization signal T3, so as to restore the non-encrypted data S7 and input this data S7 to the main control circuit 21. The main control circuit 21 transfers the data S7 sequentially inputted from the reception control circuit 23 to the CPU 11.

As described above, in the memory system 1 according to the present embodiment, the transmission control circuit 22 and the encryption/decryption circuit 24 acting as an encryption circuit operate in synchronization with the clock C1 (first clock), and the reception control circuit 23 and the encryption/decryption circuit 24 acting as a decryption circuit operate in synchronization with the clock C2 (second clock). Thus even when a communication speed is enhanced, encryption and decryption are appropriately synchronized, and in consequence, enhanced-speed encrypted communication between the host device 2 and the memory device 3 is realized at low cost and in a simple manner.

The control circuit 51 of the memory device 3 feeds the clock C1 received from the transmission control circuit 22 of the host device 2 back to the reception control circuit 23 of the host device 2 as the clock C2. The reception control circuit 23 controls data reception from the memory device 3 in synchronization with the fed-back clock C2. No need for newly generating a data strobe signal separate from the clocks C1 and C2 allows omission of a data strobe signal generation circuit and a timing-adjustment circuit, and in consequence, enhanced-speed encrypted communication between the host device 2 and the memory device 3 is realized at low cost and in a simple manner. Since the clock C1 is fed back as the clock C2, in transmitting the encrypted data S7A from the memory device 3 to the host device 2 in synchronization with the clock C2, a propagation delay amount due to wiring and buffer delays is substantially canceled with the clock C2 and the encrypted data S7A, which in consequence prevents data loss.

The main control circuit 21 of the host device 2 determines a delay cycle correction value on the basis of a propagation delay amount between the host device 2 and the memory device 3, and on the basis of this delay cycle correction value, the transmission control circuit 22 corrects the number of cycles of the clock C1 between start of data reception from the memory device 3 and completion of data reception. As described above, correcting a fixed number of cycles defined by a communication protocol on the basis of a delay cycle correction value determined from an undefined amount of propagation delay ensures a fixed number of cycles without excess and deficiency, and in consequence, internal conditions of an encryption circuit and a decryption circuit of the host device 2 (in the above example, the encryption/decryption circuit 24) and an encryption circuit and a decryption circuit of the memory device 3 (in the above example, the encryption/decryption circuit 61) agree, which realizes a normal operation of the system.

The main control circuit 21 determines a delay cycle correction value on the basis of the count value S3 of the transmission counter 32 between completion of command transmission to the memory device 3 and reception of the ready signal S6 from the memory device 3 and the count value S8 of the reception counter 42 between reception of the initial busy signal S6 from the memory device 3 and reception of the ready signal S6 from the memory device 3. Thus a delay cycle correction value is accurately determined on the basis of an undefined amount of propagation delay due to wiring and buffer delays and undefined number of busy cycles in readouts of data from the memory array 52, which realizes highly accurate correction of the fixed number of cycles.

The encryption/decryption circuit 24 commonly acting as an encryption circuit and a decryption circuit reduces a circuit size of the host device 2, in comparison with a separately provided encryption circuit and decryption circuit.

Embodiment 3

Figure 7:
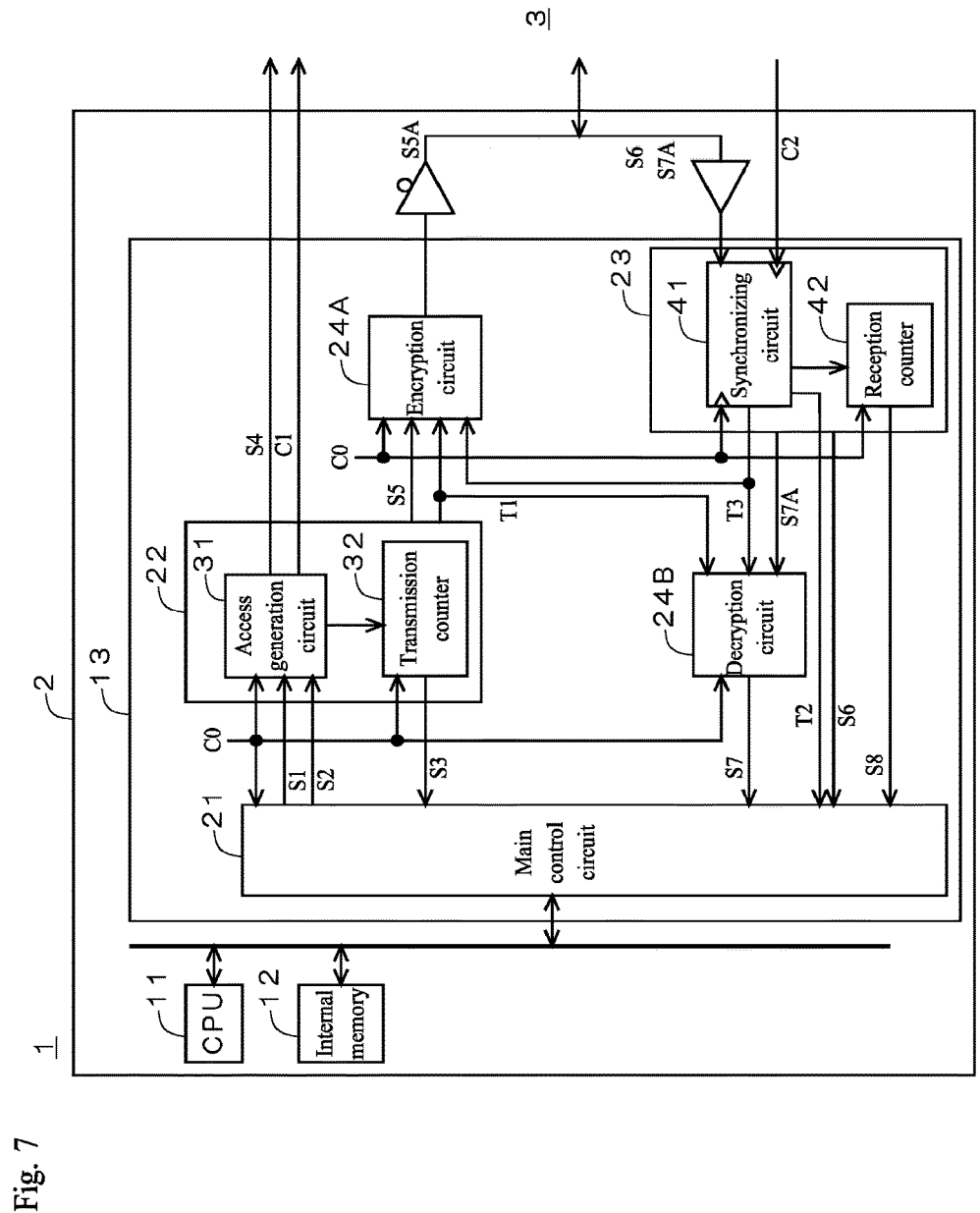
FIG. 7 is a diagram illustrating a configuration of a memory system according to Embodiment 3 of the present disclosure.

FIG. 7 is a diagram illustrating a configuration of a memory system 1 according to Embodiment 3 of the present disclosure. An encryption circuit 24A and a decryption circuit 24B are separately provided in place of the encryption/decryption circuit 24 illustrated in FIG. 5.

In the command transmission period P1, the command S5 is input from the transmission control circuit 22 to the encryption circuit 24A, in order to generate the encrypted command S5A from the non-encrypted command S5. At that time, the synchronization signal T1 to operate the encryption circuit 24A is input from the transmission control circuit 22 to the encryption circuit 24A and also to the decryption circuit 24B.

In the data reception period P3, the encrypted data S7A is input from the reception control circuit 23 to the decryption circuit 24B, in order to restore the encrypted data S7A to the non-encrypted data S7. At that time, the synchronization signal T3 to operate the decryption circuit 24B is input from the reception control circuit 23 to the decryption circuit 24B and also to the encryption circuit 24A.

As described above, in the memory system 1 according to the present embodiment, the encryption circuit 24A and the decryption circuit 24B are separately provided. This facilitates optimal circuit designs independently for the encryption circuit 24A and the decryption circuit 24B.

The transmission control circuit 22 inputs the synchronization signal T1 (first synchronization signal) to the encryption circuit 24A and the decryption circuit 24B, so as to operate the decryption circuit 24B in a period in which the encryption circuit 24A encrypts the command S5. The reception control circuit 23 inputs the synchronization signal T3 (second synchronization signal) to the encryption circuit 24A and the decryption circuit 24B, so as to operate the encryption circuit 24A in a period in which the decryption circuit 24B decrypts the encrypted data S7A. As described above, one of the encryption circuit 24A and the decryption circuit 24B is operated in vain in a period in which the other performs processes so that internal conditions such as key streams of the encryption circuit 24A and the decryption circuit 24B agree, which in consequence realizes an appropriate encrypted communication.

Modification 2

Figure 8:
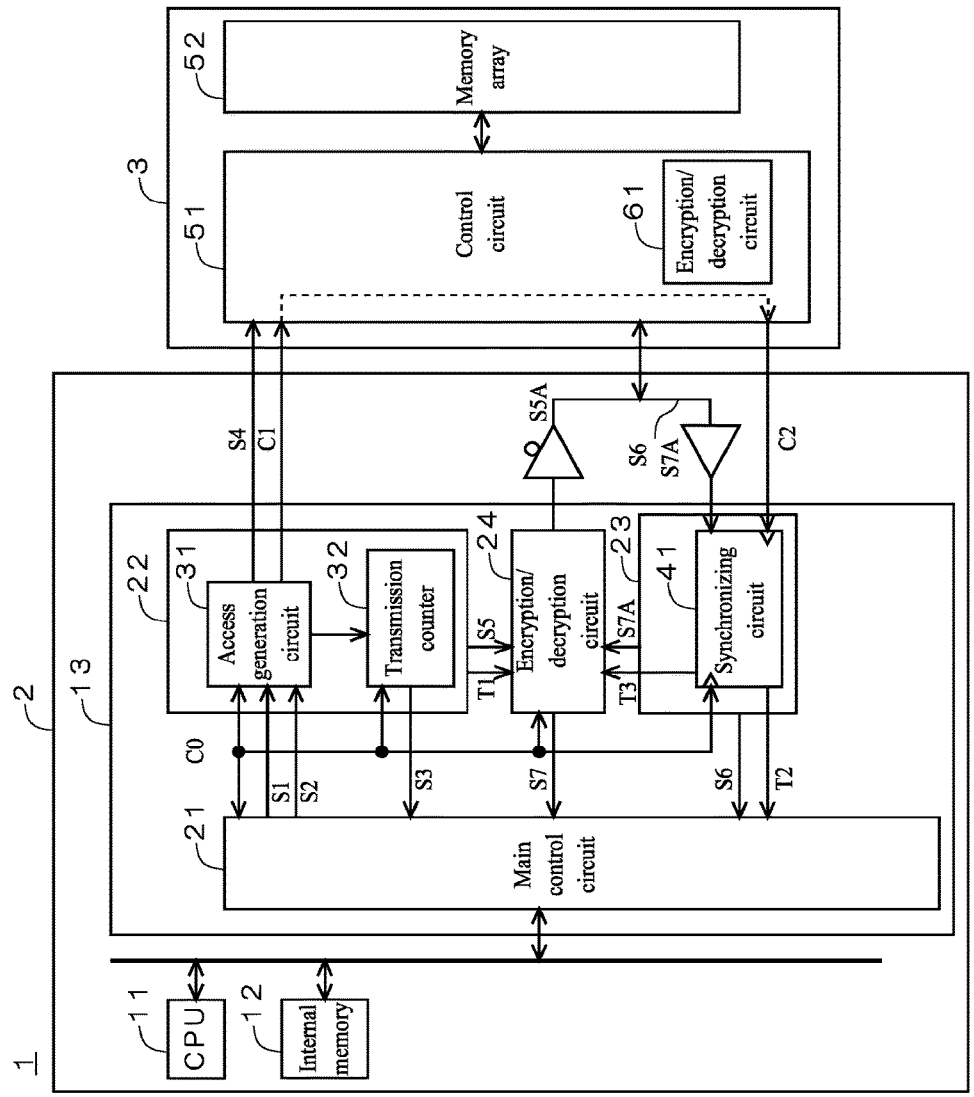
FIG. 8 is a diagram illustrating a configuration of the memory system according to Modification 2.
Figure 9:
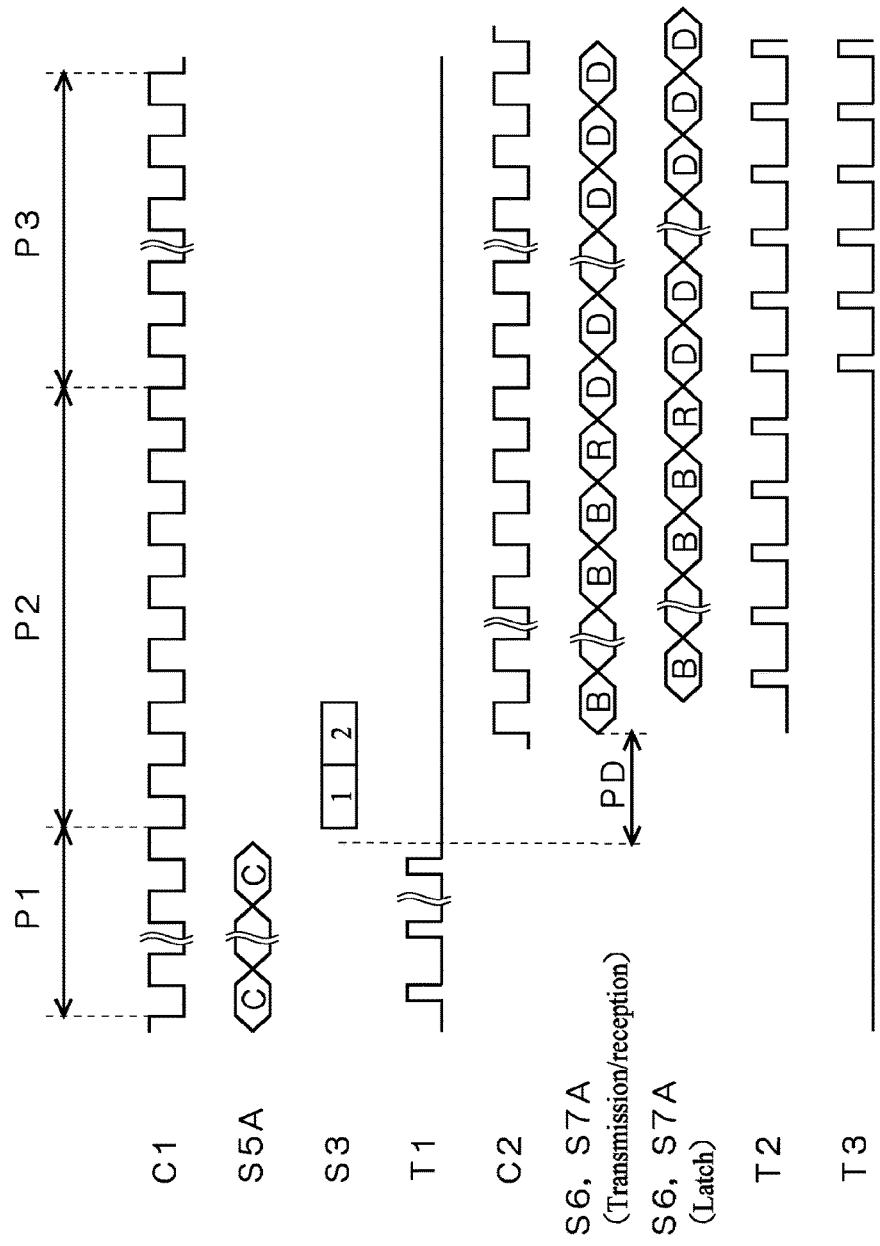
FIG. 9 is a timing diagram illustrating a readout operation by the memory system.

FIG. 8 is a diagram illustrating a configuration of the memory system 1 according a modification of Embodiment 2. The reception counter 42 is omitted from the configuration illustrated in FIG. 5. FIG. 9 is a timing diagram illustrating a readout operation by the memory system 1.

Upon transmission of the last byte (eighth byte) of the encrypted command S5A, the access generation circuit 31 causes the transmission counter 32 to start a count operation, and the transmission counter 32 counts the number of cycles onward of the clock C1.

Upon reception of the leading busy signal S6 from the reception control circuit 23, the main control circuit 21 obtains the count value S3 at the time from the transmission counter 32. Then the number of cycles indicated by the count value S3 is determined as a delay cycle correction value. This delay cycle correction value is input to the access generation circuit 31 as access information.

The access generation circuit 31 subtracts the number of cycles equivalent to the inputted delay cycle correction value from the number of cycles in a data reception period defined by a communication protocol (in this example, 512 cycles), so as to correct the number of cycles in the data reception period P3. For example, with the delay cycle correction value being "two cycles," the terminal point of the data reception period P3 is when the clock C1 proceeds by 510 (=512−2) cycles after the ready/busy period P2 terminates.

As described above, in the memory system 1 according to the present modification, the main control circuit 21 determines a delay cycle correction value on the basis of the count value S3 of the transmission counter 32 between completion of transmission of the encrypted command S5A to the memory device 3 and reception of the initial busy signal S6 from the memory device 3. Thus the delay cycle correction value is determined in a simple manner on the basis of an undefined amount of propagation delay due to wiring and buffer delays. Since the delay cycle correction value is determined at an early stage without waiting for the ready/busy period P2 to terminate, in case of an abnormal delay cycle correction value, error handling can be started at an early stage. Furthermore, with no need for the reception counter 42 and with reduced count values of the transmission counter 32, the circuit size of the host device 2 is reduced as a whole.

While the present modification is applied to Embodiment 2 in the above example, the present modification is also applicable to Embodiment 3 with same advantage as the above. While the invention has been described in detail, the foregoing description is in all aspects illustrative and not restrictive. It is understood that numerous other modifications and variations can be devised without departing from the scope of the invention.

What is claimed is:

1. A memory system comprising:
    a host device; and
    a memory device configured to be connected to the host device,
    wherein the host device includes:
        a transmission control circuit configured to control command transmission to the memory device in synchronization with a first clock, and
        a reception control circuit configured to control data reception from the memory device in synchronization with a second clock,
        a main control circuit configured to control the transmission control circuit and the reception control circuit,
    wherein the memory device includes:
        a memory array configured to store data, and
        a control circuit configured to control an access to the memory array,
    wherein the transmission control circuit is configured to transmit the first clock to the control circuit,
    wherein the control circuit is configured to transmit the first clock received from the transmission control circuit to the reception control circuit as the second clock,
    wherein the main control circuit is configured to determine a predetermined correction value based on a propagation delay amount between the host device and the memory device, and
    wherein the transmission control circuit is configured to correct a cycle number of the first clock between start of data reception from the memory device and completion of the data reception based on the predetermined correction value received from the main control circuit.

2. The memory system according to claim 1, wherein:
    the transmission control circuit includes a first counter configured to count a cycle number of the first clock,
    the reception control circuit includes a second counter configured to count a cycle number of the second clock, and
    the main control circuit is configured to determine the correction value based on a count value of the first counter between completion of command transmission to the memory device and reception of a ready signal from the memory device and a count value of the second counter between reception of an initial busy signal from the memory device and reception of a ready signal from the memory device.

3. The memory system according to claim 1, wherein:
    the transmission control circuit includes a first counter configured to count a cycle number of the first clock, and
    the main control circuit is configured to determine the correction value based on a count value of the first counter between completion of command transmission to the memory device and reception of an initial busy signal from the memory device.

4. The memory system according to claim 1, wherein the host device further includes an encryption circuit and a decryption circuit, wherein:
    the encryption circuit is configured to encrypt a command to be transmitted to the memory device in synchronization with the first clock to generate an encrypted command, and
    the decryption circuit is configured to decrypt encrypted data received from the memory device in synchronization with the second clock.

5. The memory system according to claim 4, wherein the encryption circuit and the decryption circuit are separately provided.

6. The memory system according to claim 4, wherein:
    the transmission control circuit is configured to input a first synchronization signal to the encryption circuit and the decryption circuit to operate the decryption circuit in a period in which the encryption circuit encrypts the command, and the reception control circuit is configured to input a second synchronization signal to the encryption circuit and the decryption circuit to operate the encryption circuit in a period in which the decryption circuit decrypts the encrypted data.

\* \* \* \* \*